(12) United States Patent
Miyasaka (10) Patent No.: US 6,638,634 B2
(45) Date of Patent: Oct. 28, 2003

(54) METAL OXIDE LAYER HAVING OXYGEN DEFICIT TILTING STRUCTURE

(76) Inventor: Yoshio Miyasaka, No. 14-1, Makashin-cho, 2-chome, Kasugai-shi, Aichi (JP)

(*) Notice: Subject to any disclaimer, the term of this patent is extended or adjusted under 35 U.S.C. 154(b) by 0 days.

(21) Appl. No.: 09/951,180

(22) Filed: Sep. 13, 2001

(65) Prior Publication Data

US 2002/0055005 A1 May 9, 2002

(30) Foreign Application Priority Data

Sep. 14, 2000 (JP) ........................................ 2000-279388

(51) Int. Cl.⁷ ............................. B32B 15/04; B32B 9/04
(52) U.S. Cl. ..................... 428/469; 428/689; 428/697; 428/699; 428/701; 428/702
(58) Field of Search ..................... 428/469, 472.2, 428/689, 699, 701, 702, 697, 212; 29/90.7

(56) References Cited

U.S. PATENT DOCUMENTS

| | | | | |
|---|---|---|---|---|
| 4,263,060 A | * | 4/1981 | Gaucher et al. | ............ 428/336 |
| 4,715,879 A | * | 12/1987 | Schmitte et al. | ............. 65/60.2 |
| 5,215,832 A | * | 6/1993 | Hughes et al. | ............... 428/623 |
| 6,291,094 B1 | * | 9/2001 | Yoshimura et al. | ........... 429/34 |

FOREIGN PATENT DOCUMENTS

| | | | |
|---|---|---|---|
| DE | 4328389 C2 | * | 7/1998 |
| RU | 2106307 C1 | * | 3/1998 |

* cited by examiner

*Primary Examiner*—Deborah Jones
*Assistant Examiner*—Stephen Stein
(74) *Attorney, Agent, or Firm*—Donn K. Harms (57) ABSTRACT

To obtain metal oxide layer having a reactiveness to electromagnetic wave whose wave length is longer than that of ultraviolet rays, for example, visible radiation or the like. A metal oxide layer is a layer of a stable metal oxide, for example, TiO, ZnO, WO, SnO, ZrO or the like obtained by melting and adhering metal powder for forming a layer of titanium (Ti), zinc (Zn), wolfram (W), stannum (Sn) and zirconium (Zr) or the like on a surface of a product to be treated comprising of a metal, ceramics or a mixture of them by injecting the metal powder with high speed by dint of using a compressed air and has oxygen deficit tilting structure wherein bonding quantity of oxygen is decreased as goes from the surface to the inside gradually.

4 Claims, 6 Drawing Sheets

METAL OXIDE LAYER HAVING OXYGEN DEFICIT TILTING STRUCTURE

BACKGROUND OF THE INVENTION

1. Field of the Invention

The present invention relates to a photocatalyst layer having a decomposing function such as deodorizing, antibacterial and soil-preventing actions and also a hydrophilic function, and a photocatalyst coated composition having said photocatalyst layer, more particularly relates to a photocatalyst layer having a reactiveness to electromagnetic wave whose wavelength is longer than that of ultraviolet rays and a photocatalyst coated composition having said photocatalyst layer.

In the specification, "electromagnetic wave" includes light of gamma rays, ultraviolet rays, visible rays and infrared rays or the like and electric radiation.

2. Description of the Prior Art

Up to now, since photocalytic material such as titanium dioxide ($TiO_2$) (hereinafter called "titania" in the specification) or the like shows excellent decomposing function and hydrophilic function by being bathed in ultraviolet rays included in sunlight or the like. Therefore, such a metal oxide layer has been utilized conventionally in many fields as photocatalyst.

Among the photocatalyst materials, said titania will be described as an example.

When titania is bathed in ultraviolet rays included in sunlight, electron and holes are generated on a titania surface. Then the electron reduces oxygen in air then changes the oxygen into super oxide ions ($O_2$), or, holes oxidize water adhered on the titania surface then changes the water into hydroxyl group radical (OH). The super oxide ions and the hydroxyl group radical decompose an organic compound such as dirt on the titania surface with oxidizing. That is, photocatalysis excites catalysis on titanium oxide by reduction power of the electron and the oxidization power of holes.

To describe now the hydrophilic function, the super oxide ions and hydroxyl groups generated by the ultraviolet irradiation as described above decompose hydrophobic molecules present on the titania surface to produce hydroxyl groups, and the atmospheric moisture is adsorbed by the hydroxyl groups thus produced to form a thin water film, thus imparting hydrophilicity to the titania surface. Accordingly, photocatalysts are frequently utilized in lenses, interior materials and furniture, such as mirrors, wall papers and curtains for the purpose of imparting deodorizing, antibacterial and soil-preventing actions, because of their hydrophilic function as well as the decomposing function.

When these photocatalysis are to be utilized in products such as interior materials and furniture, the product is impregnated with titania as a major component of the photocatalyst and is irradiated well with ultraviolet light. As a technique of achieving this, it is practiced to form a titania layer on the surface of a product to be treated.

As one method of forming a titania layer, a product to be treated made of titanium or titanium alloy is oxidized on the surface to form an oxide layer or a titania layer utilizing its liability to undergo oxidation reactions, since titanium per se is an active metal and have particularly great affinity with oxygen.

As other methods for forming a titania layer, a sol-gel method and a binder method are employed.

According to the sol-gel method, an organic titanium sol such as of titanium alkoxide and titanium chelates, which are precursors of titania, is applied onto the surface of a product to be treated having heat resistance, such as glass and ceramics by means of spray layer and the like, and then dried to cause gelation, followed by heating to 500° C. or higher and form a stiff titania layer. Since titania particles are distributed over the entire surface of the product to be treated, the titania layer thus formed has high decomposition power and high hardness.

Meanwhile, according to the binder method, titania particles are immobilized on the surface of a product to be treated using a binder, for example, an inorganic binder such as silica or an organic binder such as silicone. The difference of the binder method from the sol-gel method is that the heating temperature may be the hardening temperature of the binder, so that the former requires a heat treatment at about 100° C. or lower and no high-temperature treatment.

The conventional photocatalyst layer methods described above involve the following problems.

1. Difficulty in forming a titania layer on a surface to be treated (1) The method of forming a titania layer by surface-oxidizing a product to be treated made of titanium or titanium alloy involves problems in that titanium per se is expensive to cause cost elevation and that titanium has poor processability and the fields of its application are limited.

(2) The sol-gel method also involves a problem in that it requires a heat treatment at about 500° C. or higher for converting the organic titanium such as titanium alkoxide and titanium chelates, which are precursors of titania, into a titania layer, so that the product to be treated should have heat resistance, and that the product to be treated is limited to glass, ceramics and the like. If a titania layer is to be formed on the surface of a metal according to the sol-gel method, the metal surface is oxidized by the high-temperature heat treatment to cause reduction of commercial value due to deterioration and reduced luster.

The sol-gel method further involves a problem in that it requires much time and labor since the organic titanium is applied many times, that it requires an expensive equipment to cause cost elevation, and that harmful waste is by-produced.

(3) Meanwhile, the binder method can solve the problems inherent in the sol-gel method and enjoys merits in that it can treat various kinds of products and that it is relatively inexpensive. However, it involves a problem in that it is necessary to use as the binder a material which has high adhesion with the product to be treated and which is not susceptible to the decomposing function of the photocatalyst, and that selection of binder influences the effect of the catalyst.

Further, the titania layer formed according to the binder method has a hardness lower than that of the layer formed according to the sol-gel method, disadvantageously. In order to increase the hardness of the titania layer to be obtained according to the binder method, the amount of binder is increased to enhance adhesion. In this case, however, the amount of titania is reduced relative to the binder, and the titania layer shows poor decomposing power. On the contrary, if the amount of binder is reduced, the amount of titania to be exposed on the surface of the product to be treated is increased to show enhanced decomposing power, but the adhesion is reduced to readily cause peeling of the titania layer, resulting in the reduced hardness, disadvantageously. 2. Not reacting to an electromagnetic wave whose wavelength is longer than that of ultraviolet rays.

In sunlight poured on the earth, only about 4 to 5% of ultraviolet rays is included, the other is composed of about 50% of infrared rays and about 45% of visible rays. In addition, sunlight is maximized in the neighborhood of 450 nn, i.e., a visible radiation area, therefore, if photocatalyst responding to light of wavelength in the visible radiation area can be provided, more effective photocatalytic reaction can be obtained.

However, said photocatalyst made of titania is excited only by ultra violet rays whose wavelength is shorter than 380 rim and if visible rays whose wavelength is about 400 to 800 nm or infrared rays whose wavelength is over 800 nm is irradiated, photocatalysis is not shown. Thereby, visible rays and infrared rays comprising of the greater part of sunlight can not be used for decomposing injurious material or the like, therefore, sunlight can not be used efficiently.

Furthermore, in a room or the like which can not be irradiated by sunlight, ultraviolet rays are not irradiated, thereby, said photocatalyst can not be used. In addition, if said photocatalyst is used in the room, a special light source such as a bactericidal lamp emitting an ultraviolet rays must be prepared, therefore a use of photocatalyst material is restricted.

On the other hand, photocalytic material such as cadmium sulfide (CdS) or cadmium selenium (CdSe) or the like can show catalysis by light of wave length in the visible radiation area, however, a phenomenon of which cadmium sulfide (CdS) or cadmium selenium (CdSe) is ionized then dissolved by electrochemical reaction such as transfer of electron in case of reaction. Thereby, the photocalytic material can not be used stably.

To improve reactive efficiency of photocatalyst material such as titanium dioxide or the like as previously mentioned, the following methods are suggested, however, in case of using the methods, some problems still remain as described below;

2-1. It is known that photocatalysis of a titania layer is improved by supporting precious metal such as platinum, palladium, gold, silver and copper or the like on a metal oxide layer, however these precious metals are expensive, therefore if 1% of the precious metal to a weight of a formed metal oxide layer is supported, cost for forming the layer is rose 5 to 10 times.

2-2. It is known that absorption of light can be shifted to a side of long wave length and light in a visible radiation area can be absorbed by implanting a very small quantity of metal ions such as vanadium (V), chrome (Cr) or the like in a layer. However, in such case, facilities for implanting the metal ions is expensive and a large amount of initial investment is required.

2-3. In addition, there is a method for improving efficiency of photocatalytic reaction by securing a specific surface area of which a layer is formed as large as possible, however, the more the specific surface area is enlarged, the more inorganic material can be adhered easily by being the surface uneven. The photocatalyst comprising of metal oxide can decompose organic material, however it can not decompose inorganic material, therefore, adhered inorganic material is kept adhering on a surface using a photocatalytic agent without being decomposed, thereby photocatalysis can not be obtained.

SUMMARY OF THE INVENTION

The invention has been made as a solution to the above problems, and an object thereof is to obtain a metal oxide layer which can be formed on a surface of a product to be treated by relative simple method such as shot peening and to provide a metal oxide layer showing photocatalysis by responding not only to ultraviolet rays but also to an electromagnetic wave whose wave length is longer than that of ultraviolet rays, i.e., visible rays or the like, for example, visible rays, infrared rays and electric wave or the like.

To achieve the above objective, a metal oxide layer of the present invention is a layer having oxide deficit tilting structure comprising of metal oxide formed by shot peening. The layer having the oxygen deficit structure comprising of metal oxide can be formed on a surface of a product comprising of metal, ceramics or a mixture of them.

In addition, precious metal may be supported in said layer, and/or metal ions can be implanted in said layer.

BRIEF DESCRIPTION OF THE DRAWINGS

The objects and advantages of the invention will become apparent from the following detailed description of preferred embodiments thereof provided in connection with the accompanying drawings in which.

DETAILED DESCRIPTION OF THE PREFERRED EMBODIMENT

The preferred embodiments for the present invention will be described below;

A metal oxide layer of the present invention relates to a layer of a stable metal oxide, for example, $TiO_2$, $ZnO$, $WO_3$, $SnO_2$, $ZrO_2$ or the like obtained by melting and adhering metal powder of titanium (Ti), zinc (Zn), wolfram (W), stannum (Sn) and zirconium (Zr) or the like on a surface of a product to be treated comprising of a metal, ceramics or a mixture of them by injecting the metal powder with high speed by dint of using compressed air then being oxidized an uppermost surface of the layer when the metal powder is melted and adhered for forming a layer.

It is preferable a shape of the injection powder as spherical or polygonal. The particle size of the powder is preferably below 200 $\mu$m, more preferably 30 to 100 $\mu$m. According to material of the injection powder, it is injected at a pressure of more than 0.3 Mpa, preferably more than 0.5 Mpa to stable an oxide layer of the uppermost surface of the formed layer.

A metal oxide layer formed by the above method has a structure of which a bond with oxygen is decreased gradually from the surface to the inside (in the text, such structure is called "oxide deficit tilting structure") of the layer and said metal oxide layer also relates to the stable metal oxide layer having oxide deficit tilting structure obtained by injecting the metal powder by dint of shot peening.

Figure 1:
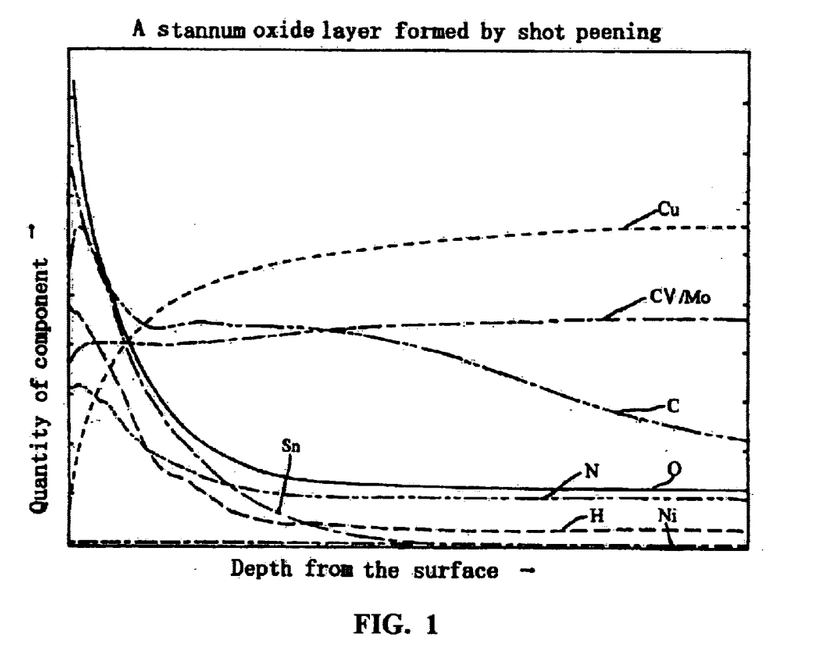
FIG. 1 is a table showing analytic result of a component of a stannum oxide layer formed by shot peening.
Figure 2:
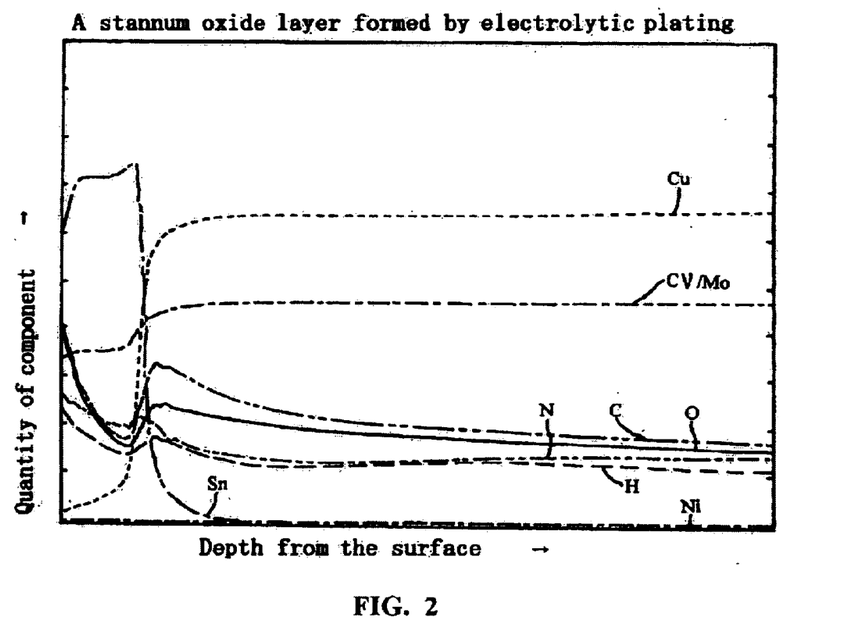
FIG. 2 is a table showing analytic result of a component of a stannum oxide layer formed by a electrolytic plating method.

As one example, analytic result by an X-rays spectral analyzer regarding a stannum oxide layer having oxide deficit tilting structure formed by injecting the powder of silicon carbide (SiC) on a surface of a copper sheet, i.e., a product to be treated as a preliminary treatment then injecting stannum powder is shown in a FIG. 1 and analytic result by the X-rays spectral analyzer regarding a stannum oxide layer formed by electrolytic plating is shown in FIG. 2.

As disclosed in FIG. 1, it is obvious that bonding quantity between a stannum oxide layer formed by injecting stannum powder by dint of shot peening and oxygen decreases as depth from the surface is deepened On the other hand, as disclosed in FIG. 2, on a stannum layer formed by electric plating, there is no fixed relation between distance from the surface of the stannum layer and bonding status with oxygen, therefore, there is no oxygen deficit tilting structure in the bonding status between stannum and oxygen.

Figure 3:
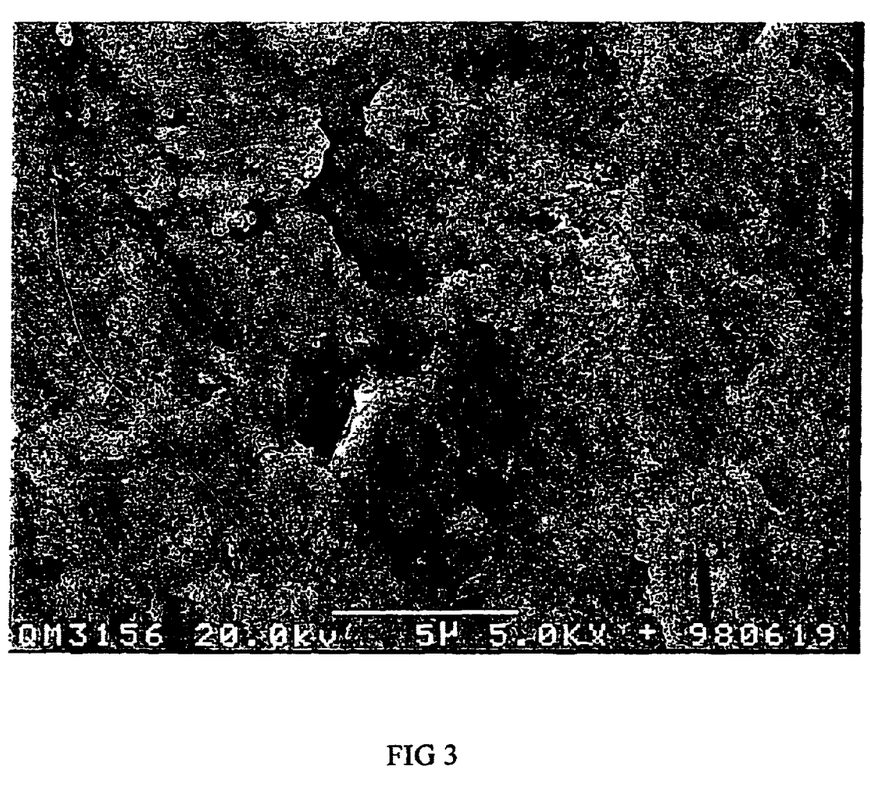
FIG. 3 is a photomicrograph of the surface of the stannum oxide layer formed by shot peening.
Figure 4:
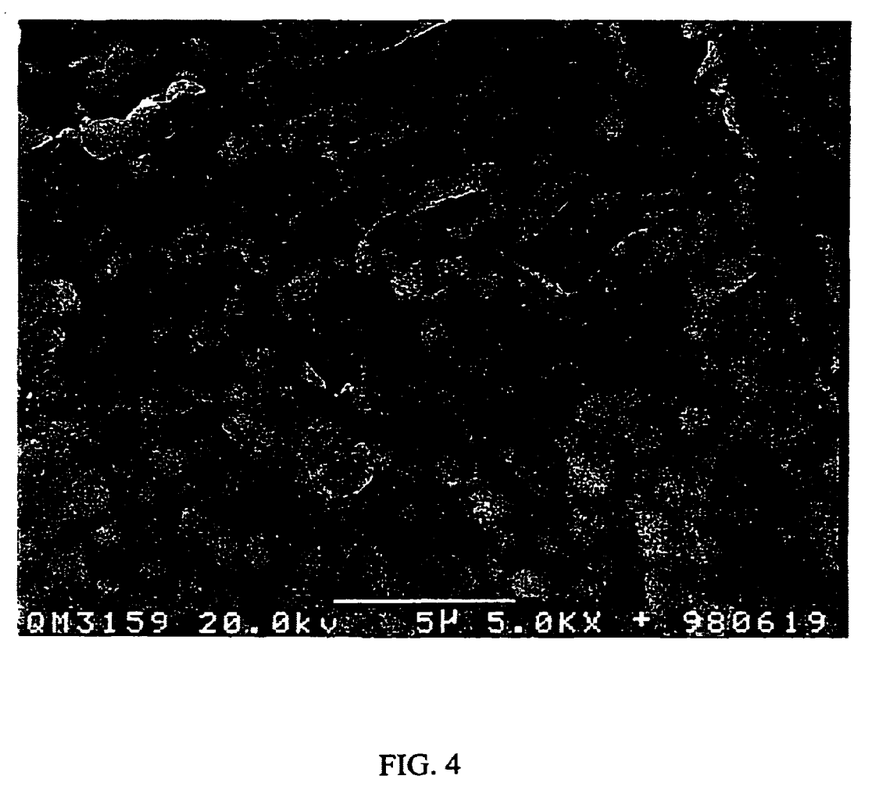
FIG. 4 is a photomicrograph of a surface of the stannum oxide layer formed by electrolytic plating.
Figure 5:
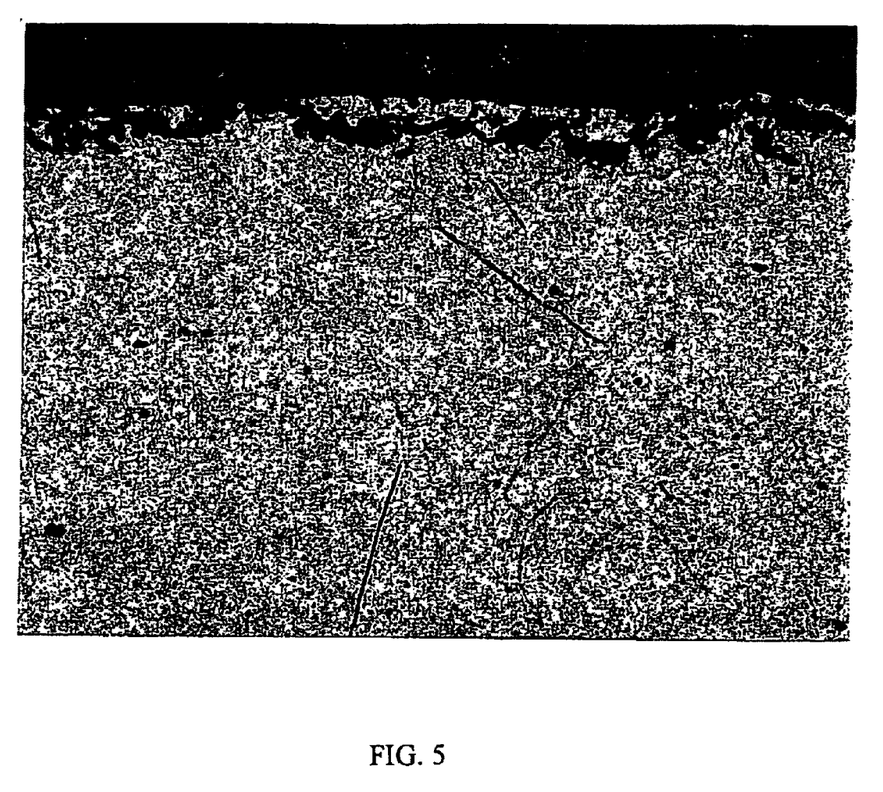
FIG. 5 is a photomicrograph of a cross section of the stannum oxide layer formed by shot peening.
Figure 6:
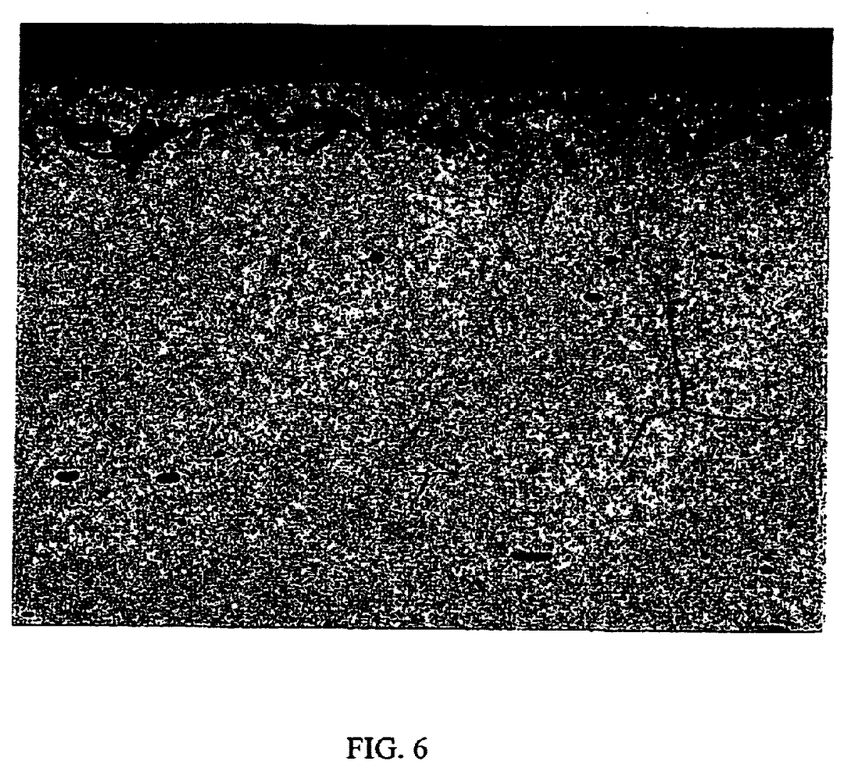
FIG. 6 is a photomicrograph of a cross section of the metal oxide layer of stannum-indium formed by shot peening.
Figure 7:
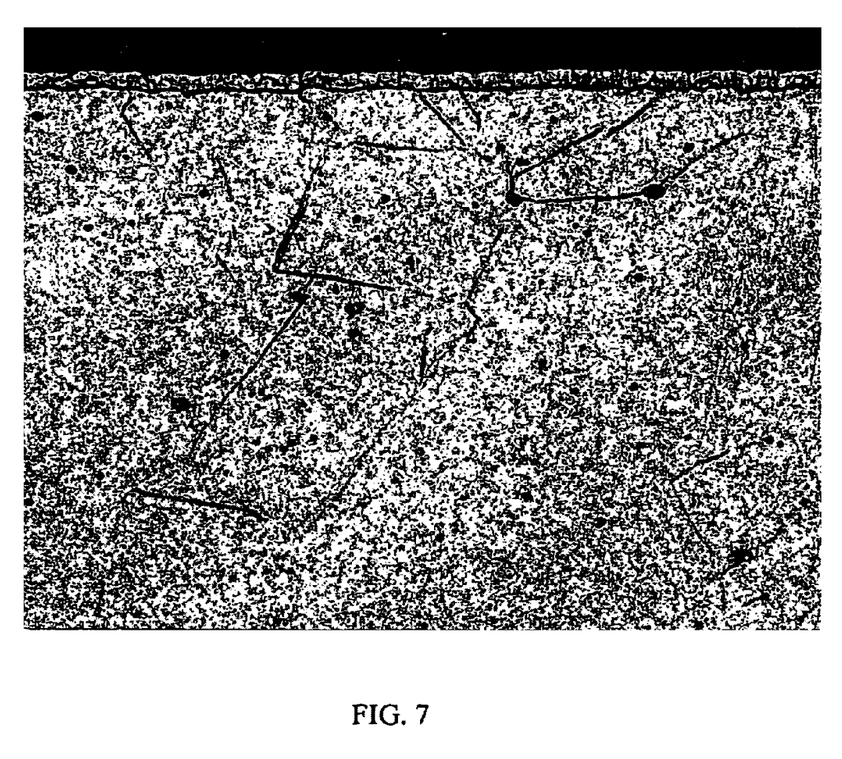
FIG. 7 is a photomicrograph of a cross section of the stannum oxide layer formed by electrolytic plating.

FIG. 3 is a photomicrograph of a surface of the stannum oxide layer formed by shot peening. FIG. 4 is a photomicrograph of the surface of the stannum oxide layer formed by electrolytic plating. FIG. 5 is an electron photomicrograph of a cross section of the stannum oxide layer formed by shot peening. FIG. 6 is an electron photomicrograph of a cross section of the metal oxide layer formed by shot peening of alloy comprising of stannum (Sn) and indium (In) in the weight-ratio of 9:1 (Other condition is the same). FIG. 7 is a microphotograph of a cross section of the stannum oxide layer formed by electrolytic plating.

As disclosed in photomicrographs of FIG. 3 to FIG. 7, composition of the oxide metal layer formed by shot peening is rather different from that of the oxide metal layer formed by electrolytic plating. It is surmised that the difference is appeared as said oxygen deficit tilting structure and also appeared as the difference is appeared as remarkable difference on development of photocatalysis.

As mentioned above, it is confirmed that when injection powder is injected on a surface of a product to be treated by shot peening, the oxide layer having oxygen deficit tilting structure of the present invention is formed. The oxide layer having oxygen deficit structure has reactability also to electromagnetic wave whose wave length is longer than that of ultraviolet rays as mentioned later and shows excellent photocatalysis in a place where ultraviolet rays are hard to be irradiated, i.e., in a room or the like.

The metal oxide layer having the oxygen deficit tilting structure by shot peening is formed under condition as shown in a following table.

TABLE 1

A forming experiment for the metal oxide layer having oxygen deficit tilting structure

| | |
|---|---|
| Blasting device | Gravity-type (SGK-4LD: Fuji Manufacturing Co. Ltd.) |
| Product to be treated | Alumina ball ($Al_2O_3$: 92.7%, $SiO_2$: 5.8%, diameter: 3 mm) |
| Preliminary treatment | |
| Injection powder | Silicon carbide (SiC) Average diameter: 0.06 mm, Polygonal shape |
| Injection pressure | 0.29 Mpa |
| Injection speed | Over 100 m/seconds |
| Diameter of the injection nozzle | 9 mm |
| Injection distance | 150 mm |

TABLE 1-continued

A forming experiment for the metal oxide layer having oxygen deficit tilting structure

| | |
|---|---|
| Additional treatment | |
| Injection powder | Stannum or Stannum (90 wt %) + indium (10 wt %) Diameter 0.05 mm Shape: Almost spherical shape |
| Injection pressure | |
| Injection speed | 0.59 Mpa Over 150 m/seconds |
| Diameter of the injection nozzle | 9 mm |
| Injection distance | 200 mm |

Manufacturing Embodiment

Then, manufacturing embodiment of the metal oxide layer having oxygen deficit tilting structure according to the present invention will be explained below together with a manufacturing method of the product to be treated of which the metal oxide layer is formed thereon (hereinafter called a "photocatalyst coated composition") and concrete use thereof.

In the following manufacturing embodiment, an example of which powder of a titanium (Ti) and stannum (Sn) is injected as injection powder will be explained, however zinc (Zn), wolfram (W) and zirconium (Zr) or the like can be used as injection powder other than titanium (Ti), stannum (Sn) shown below. In addition, one or plural kinds of them may be mixed and injected.

On the metal oxide layer of the present invention, precious metal such as platinum (Pt), palladium (Pd) or the like or metal such as vanadium (V), chrome (Cr) or the like is supported in the formed metal oxide layer by injecting precious metal together with said injection powder, and/or metal ions are implanted in the metal oxide layer. Thereby, support of precious metal described in the Prior Art or implantation of the metal ions can be done with a relative simple method.

Injection of precious metal such as platinum (Pt) or palladium (Pd) or the like or metal such as vanadium (V), chrome (Cr) or the like can form a metal oxide layer on a surface of a product to be treated then the injection can also be applied on the metal oxide layer, however, in case of the method, a ratio of forming a layer (a ratio of melting and adhering metal powder for forming a layer on a surface of a product to be treated comprising of a metal, ceramics or a mixture of them; in the specification, hereinafter simply called a "a ratio of forming a layer") is decreased compared to a case of which precious metal such as platinum (Pt), palladium (Pd) or the like or metal such as vanadium (V), chrome (Cr) or the like is injected simultaneously with metal powder of titanium or stannum or the like. A decline of a ratio of forming a layer is caused because the formerly formed metal oxide layer shows photocatalysis thereby the surface becomes hard to be melted and adhered for forming a layer of precious metal or the like. Therefore, it is desirable that support of precious metal or implantation of metal ions is conducted simultaneous with injection of metal powder composing metal oxide.

Manufacturing Embodiment 1

Manufacture of a titanium oxide layer having oxygen deficit tilting structure.

The present experimental example will show an example for forming a titanium oxide layer having oxygen deficit tilting structure by injecting titanium (Ti) powder on a surface of a product to be treated by shot peening.

In the manufacturing embodiment, a photocatalyst coated composition was composed by forming the titanium oxide layer on relative small media, Le, ceramic balls or the like then disposed at a place required to be deodorized or sterilization or the like, thereby the photocatalytic coating composition which can show photocatalysis was manufactured.

A blasting device used in the embodiment is a gravity-type one, however, suction siphon-type or other types of blasting devices may be used if it is an air-type one.

A product to be treated as around 10 kg of alumina balls ($Al_2O_3$:92.7%, $SiO_2$:5.8%, diameter: 3 mm) are put in a barrel basket provided confronting to a point of a nozzle of the gravity-type blasting device then injection powder is injected for 20 minutes under the following condition with rotating the barrel basket so that injection powder is impinged on ceramic balls put in the barrel basket equally, thereby the photocatalytic coating treatment is conducted.

In the present embodiment, pure titanium (Ti:99.5%, average particle size: 80 $\mu$m) (#150) is used as injection powder.

TABLE 2

Manufacturing embodiment 1: Titanium oxide layer

| | |
|---|---|
| Blasting device | Gravity-type (SGK-4LD: Fuji Manufacturing Co. Ltd.) |
| Product to be treated | Alumina ball ($Al_2O_3$: 92.7%, $SiO_2$: 5.8%, diameter: 3 mm) |
| Injection powder | Pure titanium (Ti: 99.5% Average particle size: 80 $\mu$m, Polygonal shape) |
| Injection pressure | 0.6 Mpa |
| Infection speed | Over 150 m/seconds |
| Diameter of injection nozzle | 9 mm |
| Injection distance | 200 mm |

A titanium oxide layer having tilting structure of which oxygen to be combined is decreased as goes from the surface to the inside gradually (as one example, $TiO_xX=2.00\sim1.95$) is formed on alumina balls as a photocatalytic layer compound obtained by the above processing condition.

Manufacturing Embodiment 2

Manufacture of stannum oxide layer having oxygen deficit tilting structure.

About 10 kg of alumina balls ($Al_2O_3$:92.7%, $SiO_2$:5.8%, diameter: 3 mm) as a product to be treated are stored in a barrel basket provided confronting to the point of a nozzle of the gravity-type blasting device and photocatalytic layer treatment is done by injecting injection powder for 20 minutes under the following condition with rotating the barrel basket so that stannum (Sn) powder as injection powder is impinged on ceramic balls stored in the barrel basket equally.

In the present embodiment, stannum (Sn:99.7%, average particle size: 55 $\mu$m, spherical shape) is used as injection powder. In addition, a melting point of stannum is 232° C., however, the above treatment is done with injecting pressure of 0.6 Mpa to stabilize oxidization of a surface of the product.

TABLE 3

Processing condition of the manufacturing embodiment 2

| | |
|---|---|
| Blasting device | Gravity-type (SGK-4LD: Fuji Manufacturing Co. Ltd.) |
| Product to be treated | Alumina ball ($Al_2O_3$: 92.7%, $SiO_2$: 5.8%, diameter: 3 mm) |
| Injection powder | Stannum (Sn: 99.7%, average particle size: 55 gm, spherical shape) |
| Injection pressure | 06 Mpa |
| Injection speed | Over 150 m/seconds |
| Diameter of injection nozzle | 9 mm |
| Injection | distance 200 mm |

Comparative Experiment

A comparative experiment for catalysis between the photocatalyst coated composition of a titanium oxide formed by said manufacturing embodiment 1 (hereinafter called "Example 1") and a photocatalyst coated composition of a stannum oxide formed by said manufacturing embodiment 2 (hereinafter called "Example 2") as previously mentioned was conducted.

1. Measurement of Change of ORP in Tap Water (1-1) Performance comparative experiment Change of ORP in tap water wherein the photocatalyst coated compositions of the examples 1 and 2 manufactured by said methods were stored therein, tap water wherein torumarine known as a generation source of minus ions was stored therein (Comparative example 1) and un-treated (green) water wherein no catalyst was stored therein (An un-treated product) was measured as time passes by. The result will be described as follows:

In the comparative experiment, 100 cc of tap water was poured in a 100 cc beaker respectively then 10 g of catalysts were stored therein respectively (concerning an un-treated one, no catalyst was stored), then ORP was measured per ten minutes. Furthermore, concerning photocatalyst, only sunlight was irradiated.

TABLE 4

Measurement of change of ORP in tap water

| | Change of ORP (mv) | | | |
|---|---|---|---|---|
| Passing time (minutes) | Example 1 (TiO2) | Example 2 (SnO2) | Comparative Example 1 (torumarine) | un-treated product |
| 0 | 721 | 717 | 723 | 703 |
| 10 | 680 | 677 | 693 | 710 |
| 20 | 641 | 631 | 660 | 723 |
| 30 | 602 | 574 | 615 | 725 |
| 40 | 567 | 510 | 564 | 727 |
| 50 | 532 | 460 | 515 | 727 |
| 60 | 505 | 424 | 476 | 728 |
| 70 | 479 | 390 | 458 | 728 |
| 80 | 453 | 357 | 437 | 728 |
| 90 | 430 | 336 | 429 | 727 |
| 100 | 410 | 314 | 423 | 727 |
| 110 | 405 | 301 | 419 | 727 |
| 120 | 398 | 298 | 415 | 726 |

In addition, ORP is an abbreviation of Oxidation Reduction Potential and a decline of numerical values of ORP shows that tap water is reduced.

As shown in a table 4, ORP in tap water wherein the photocatalyst coated composition of which a titanium oxide layer of the present invention was formed thereon was stored therein was decreased as time passes by, in addition, the ORP was decreased more than that of torumarine known as a generation source of minus ions, therefore it was confirmed that the photocatalyst coated composition shows a reduction power equal to or more than that of torumarine and it was confirmed that catalytic reaction, i.e., a photocatalysis was excited by the titanium oxide layer of the present invention.

(1-2) Changes of light volume and ORP in tap water

The photocatalyst coated composition of the example 1 was stored in tap water then irradiating light volume was changed and difference of change of ORP was measured. The other conditions are same as those of said performance comparative experiment (1-1).

The comparison was conducted under following four steps of light volume in consideration of use in a daily life.

Light volume 1: Almost dark environment
Light volume 2: Dark environment of evening
Light volume 3: Bright environment of daytime (indoor)
Light volume 4: Environment exposed to direct sunlight (outdoor)

TABLE 5

Changes of light volume and ORP in tap water

| Passing time (minutes) | Change of ORP (mv) | | | |
|---|---|---|---|---|
| | Light volume 1 | Light volume 2 | Light volume 3 | Light volume 4 |
| 0 | 720 | 710 | 721 | 712 |
| 10 | 707 | 696 | 680 | 633 |
| 20 | 684 | 689 | 641 | 541 |
| 30 | 668 | 670 | 602 | 470 |
| 40 | 641 | 666 | 567 | 407 |
| 50 | 621 | 653 | 532 | 352 |
| 60 | 605 | 639 | 505 | 322 |
| 70 | 589 | 625 | 479 | 289 |
| 80 | 574 | 610 | 453 | 265 |
| 90 | 568 | 596 | 430 | 247 |
| 100 | 549 | 582 | 410 | 235 |
| 110 | 537 | 560 | 405 | 228 |
| 120 | 528 | 554 | 398 | 228 |

As a result of the above experiment, it was confirmed that the photocatalyst coated composition of the example 1 shows prominent effect as a reducing agent as irradiated light volume is increased, therefore it was also confirmed that the photocatalyst coated composition of the example 1 shows high performance as catalyst is shown, furthermore, it was confirmed that ORP is decreased even in status of which seldom light is irradiated.

As shown in the above, the photocatalyst coated composition of the example 1 showed catalyst even in environment wherein no visible ray was irradiated, therefore, it can be recognized that catalysis of the photocatalyst coated composition of the example 1 is excited also by an electromagnetic wave whose wave length is longer than that of ultraviolet rays or visible rays.

2. A Color Fading Experiment of Methylene Blue and a Clarifying Experiment of Water in a Water Tank A color fading experiment of methylene blue and a clarifying experiment of water in a water tank were compared by using a photocatalyst coated composition of the example 1 of the present invention and a photocatalyst coated composition made by printing then coating titania powder on sand (hereinafter called "Comparative example 2").

In addition, titanium dioxide used for coating of sand in the comparative example was anatase titanium dioxide (powder) for photocatalyst on the market, and in the present example, "P25"($TiO_2$:99.5%, average particle size: under 25 nm (X-ray), specific surface area: 300 ($m^2/g$)) made by Japan Aerozil Co., Ltd. was used.

(2-1) A color fading experiment of methylene blue

In the present comparative experiment, 20 g of the photocatalyst coated compositions of the example 1 and the comparative example 1 were stored in 10 ml of water solution of which 60 mg of methylene blue per 1 l was dissolved therein, then left at rest at a position under about 30 cm of a bactericidal lamp for 60 minutes.

A 0.2 ml of the water solution was extracted from the above water solution and diluted 20 times then 665 nm of rays were irradiated and the absorbance was measured then degree of color fading of methylene blue was measured. The result of measurement will be described in a following table;

TABLE 6

A Color fading experiment of methylene blue

| | Comparative Example 2 | Example 1 | Un-treated status |
|---|---|---|---|
| Starting status of the experiment | 0.1005 | 0.5360 | 0.5517 |
| Decreasing ratio to un-treated status | 81.8% | 2.8% | 0% |

(2-2) A clarifying experiment of water in a water tank

A 300 g of the photocatalyst coated compositions of the example 1 and the comparative example 2 were stored in a water tank of 50 cm×100 cm×30 cm, 1.5 w of pump and 55 l of quantity of water respectively then 5 goldfishes of about 10 cm long were raised for 30 days, i.e., from Jun. 1 to Jun. 30, 2001 respectively.

The water tank was disposed at the window in a room and only sunlight was irradiated then the same quantity of food was fed at the same time in a experiment term.

In the above experiment, observed result of change of water condition in the water tank will be shown in a following table:

TABLE 7

A water clarifying experiment

| | Comparative Example 2 | Example 1 | No catalyst |
|---|---|---|---|
| Generating status of water-bloom | Generated about 7 days later | Not generated for 30 days | Generated about 7 days later |
| Generating status of odor | Generated little for 2–3 days | Not generated during experiment term | Generated |
| Status of goldfish | Normal | Moved actively | Normal |

As a result of the above experiment, as shown in a result of color fading experiment of methylene blue, it was confirmed that the photocatalysis of the photocatalyst coated composition of the example 1 was inferior to that of the comparative example 2 in case of which only ultraviolet rays were irradiated. Meanwhile, it was confirmed that the photocatalysis of the example 1 showed more excellent photocatalysis than that of the comparative example 2 under the irradiation of sunlight.

Thereby, it was confirmed that the photocatalyst coated composition of the example 1 showed photocatalysis by reacting to for example, visible ray or infrared ray, i.e., electromagnetic wave whose wave length is longer than that of ultraviolet ray.

3. A Deodorant Experiment in a Car

A result of a deodorant experiment in a car by using a photocatalyst coated composition of the example 2 and a photocatalyst coated composition comprising of said sand covered with titanium dioxide (the comparative example 2) will be shown as follows:

In the present comparative experiment, a deodorant experiment is conducted by disposing same quantity of the photocatalyst coated compositions of the example 2 and the comparative example 2 in the same types of sedan cars (3000 cc displacement, a five-seater, using UV cut glass) respectively.

100 g of photocatalyst coated compositions of the example 2 and the comparative example 2 are stored in ashtrays provided on the back seats of objective cars for the deodorant experiment respectively, then 20 cigarettes are smoked at intervals of about 30 minutes in a status of which ashtray covers were opened in closed cars.

Then, in 30 minutes later, smell of cigarette remained in the cars was checked by 5 non-smokers. The result will be shown in a following table:

TABLE 8

Result of a deodorant experiment for cigarette

|  | Comparative example 2 | Example 2 |
|---|---|---|
| Deodorization of cigarette | Smell of cigarette was existed. Deodorant effect could not be acknowledged | Smell of cigarette was not existed. Excellent deodorant effect could be acknowledged |

As a result of the above comparative experiment, the deodorant effect of the photocatalyst coated composition of the comparative example 2 could not be acknowledged. The result might be caused because UV-cut glass was used in the car for the deodorant experiment, therefore, light wherein ultraviolet rays were removed was irradiated. Namely, it is surmised that the photocatalysis of the photocatalyst coated composition of the comparative example 2 stored in the ashtray on the back seat of the car was not shown because ultraviolet rays was not irradiated.

Meanwhile, on the photocatalyst coated composition of the example in the present invention, it is surmised that photocatalytic reaction was excited even by sunlight passed through the UV-cut glass, for example, visible radiation or infrared rays or the like, i.e., electromagnetic wave whose wave length is longer than that of ultraviolet rays, thereby smell of cigarette was deodorized satisfactory. Therefore, it was confirmed that the photocatalyst coated composition of the example 2 shows deodorant performance without irradiation of ultraviolet rays.

4. The Other Experimental Examples

As mentioned above, the photocatalyst coated composition having a layer comprising of the metal oxide having an oxygen deficit tilting structure of the present invention shows photocatalysis in response to electromagnetic wave whose wave length is longer than that of ultraviolet rays without irradiation of ultraviolet rays as previously described, thereby it can be used for various use in a place where irradiation of ultraviolet rays is difficult, i.e., for example, in a room or the like other than disinfection and deodorization in a water tank or deodorization in a car. As one example, prominent effect can be obtained by using the following use.

(4-1) Clarification of water in a glass water tank (20 l: breeding of 20 killifishes)

Using condition: indoors, no heater, including a fluorescent light/a back clarifying device 100 g of photocatalyst coated composition comprising of 3–6 mm of grid wherein the titania oxide layer of the present invention were formed thereon were stored in 3 kg of small stones in the bottom of the water tank. As a result, fishy smell in the water tank was extinguished then outbreak of disease was decreased, at the same time, growth of algae was decreased. Thereby it is only required a cleaning of a filter and addition of water without exchanging water. In addition, killifishes came to move more actively and their appetite was increased.

(4-2) Deodorization in a glass water tank (60 l:4 tortoises of about 10 cm long)

Using condition: indoors, no heater 300 g of spherical photocatalyst coated compositions wherein diameters were 5 mm and stannum oxide layers of the present invention were formed thereon was mixed in 10 kg of small stones of the bottom of the water tank Thereby strong fishy smell generated in the water tank was extinguished. In addition, the tortoises came to move more actively, and their appetite was increased.

(4-3) Cleaning of a concrete pond (12t, Breeding of 100 carps of 15 to 80 cm long)

Using condition: outdoors, using three-layer clarifying tank of 500×2000×600 mm, using a circulating pump of 12t/hour A spherical photocatalyst coated composition wherein the stannum oxide layer of the present invention is formed and the diameter is 20 mm is stored on a stainless net of 500×700 mm provided on an upper part of the second layer of clarifying tank. As a result, fishy smell in a pond is deodorized and generation of disease of carps is decreased. In addition, the number of breeding carps can be increased. Thereby, only cleaning of the photocatalytic composition and addition of a little ground water are required as management of a pond, and movement of carps became more active and growth of carps became remarkably.

(4-4) Deodorization of toilet

Using condition: Japanese-style flash toilet, a single room 100 g of spherical photocatalyst coated compositions wherein the diameters are 3 mm and the titanium oxide layers of the present invention were formed thereon were put on a plastic tray then left. As a result, odor which can not be deodorized by even using various deodorants or aromatics was deodorized.

(4-5) Prolongation of life of cut flowers

Using condition: used for a ceramic flower vase put on a shoe cupboard in the room 20 g of spherical photocatalyst coated compositions wherein the diameters were 5 mm and the titanium oxide layers of the present invention were formed thereon were stored in water in the flower vase (1 l) then flowers were put in the flower vase. The cut flower without being stored the photocatalyst coated compositions was dead about two days later, on the other hand, the cut flower put in the flower vase wherein said photocatalyst coated compositions were stored therein was kept their freshness for about one week. Furthermore, there was no decay of a cue end of the cut flower and characteristic odor generated in the flower vase was not recognized.

(4-6) Deodorization of a toilet for a pet

Using condition: indoors, a plastic case of 500×500 mm, breeding of a cat 2.5 kg of grid shaped (average particle size: 3–5 mm) photocatalyst coated compositions wherein the titanium oxide layers of the present invention were formed thereon were mixed in 5 kg of sand for a toilet for cat on the market then put in said case and used. On the sand for toilet of cat on the market, deodorant effect could be obtained for 2 to 3 days when the sand was new, then the deodorant effect was decreased sharply. However, the deodorant effect was kept by mixing the photocatalyst coated composition therein.

(4-7) Deodorization of a pet

Using condition: indoor, a room of 7.29 $m^2$, breeding of a dog 500 g of the photocatalyst coated compositions wherein the diameters were 5 mm and the oxide titanium layers were formed were stored in a glass plate and left on a chest. As a result, odor of pets which could be deodorized merely temporarily even by using deodorant for pets and an aromatic was deodorized.

(4-8) Deodorization, sterilization and anti-bacterial treatment of a sink

Using condition: Used to a food garbage basket/an exhaust port of a sink for an indoor kitchen 20 grains of spherical photocatalyst coated compositions wherein the stannum oxide layers of the present invention were formed thereon and the diameters were 8 mm were stored in a food garbage basket of a sink, under a garbage net set on an exhaust port. Thereby, no slime or mold was not generated and the odor peculiar to kitchen garbage could be deodorized.

(4-9) Purification of water in a bath (capacity of 300 l

Using condition: indoors, a bath tab made of stainless steel 500 g of a mixture of spheres wherein oxide titania layers of the present invention were formed thereon and spheres wherein stannum oxide layers were formed thereon (each diameters were 8 mm) were stored in a net bag and used by being soaked in a bathtub. The spheres are used by being left and dried in a state of which the spheres were touched with air in the bathroom when the bathtub was unused. By using the photocatalyst coated composition, water in the bathtub could be deodorized and adherence of dirt in the bathtub could be prevented. In addition, the mold generated on a joint of tiles was decreased, furthermore, chilly feeling after a bath was decreased and refresh effect by generation of minus ions were obtained.

(4-10) Deodorization of a stove and complete combustion

Using condition: indoors, an oil stove for a room of 9.72 $m^2$

The photocatalyst coated composition comprising of a sphere whose diameter is 8 mm is stored in 3 l of a fuel tank cartridge for oil.

Odor generated in ignition or extinguishment was deodorized by throwing the photocatalyst coated composition. In addition, thermal power of the stove under combustion was improved thereby when the stove is used by turning a setting dial to have made the heat temperature lower in one scale, the same degrees of heat quantity could be obtained. In addition, imperfect combustion could be prevented.

By the above mentioned constitution, a metal oxide layer having oxygen deficit tilting structure of the present invention can be melted and adhered for forming a layer on a surface of the product to be treated by relatively simple method, i.e., shot peening. In addition, the photocatalyst coated composition having a reactiveness for visible radiation responding for example to visible rays, i.e., electromagnetic waves other than ultraviolet rays and showing photocatalysis even in the room or dark place or the like, i.e., a place wherein the ultraviolet rays are hard to be irradiated can be obtained easily Therefore the photocatalyst coated composition can be manufactured at a relatively low cost and the photocatalyst coated composition having a reactiveness to visible radiation or the like included in the sunlight with high ratio, therefore efficiency as photocatalyst is high, in addition, it can be used for various purpose comparing to that of a conventional photocatalyst coated composition.

Thus, the broadest claims that follow are not directed to a machine that is configuration a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation as to protect the heart of this invention, as a matter of law.

It will thus be seen that the objects set forth above, and those made apparent from the foregoing description, are efficiently attained. Also, since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

What is claimed is:

1. A layer formed by shot peening and having an oxygen deficit tilting structure comprising metal oxide formed on a surface to be treated; and precious metal is supported in said layer.

2. A layer formed by shot peening and having an oxygen deficit tilting structure comprising metal oxide formed on a surface of a product comprising of metal, ceramics or a mixture thereof; and precious metal is supported in said layer.

3. A layer having oxygen deficit tilting structure according to claim 1 wherein metal ions are implanted in said layer.

4. A layer having oxygen deficit tilting structure according to claim 2 wherein metal ions are implanted in said layer.

* * * * *